3,461,790
AUTOMATIC AIRCRAFT CABIN PRESSURE
CONTROL SYSTEM
Robert C. Kinsell, Los Angeles, and Dan S. Matulich,
 Rolling Hills Estates, Calif., assignors to The Garrett
 Corporation, Los Angeles, Calif., a corporation of
 California
Filed Apr. 28, 1967, Ser. No. 634,708
Int. Cl. B64d 13/04
U.S. Cl. 98—1.5                              21 Claims

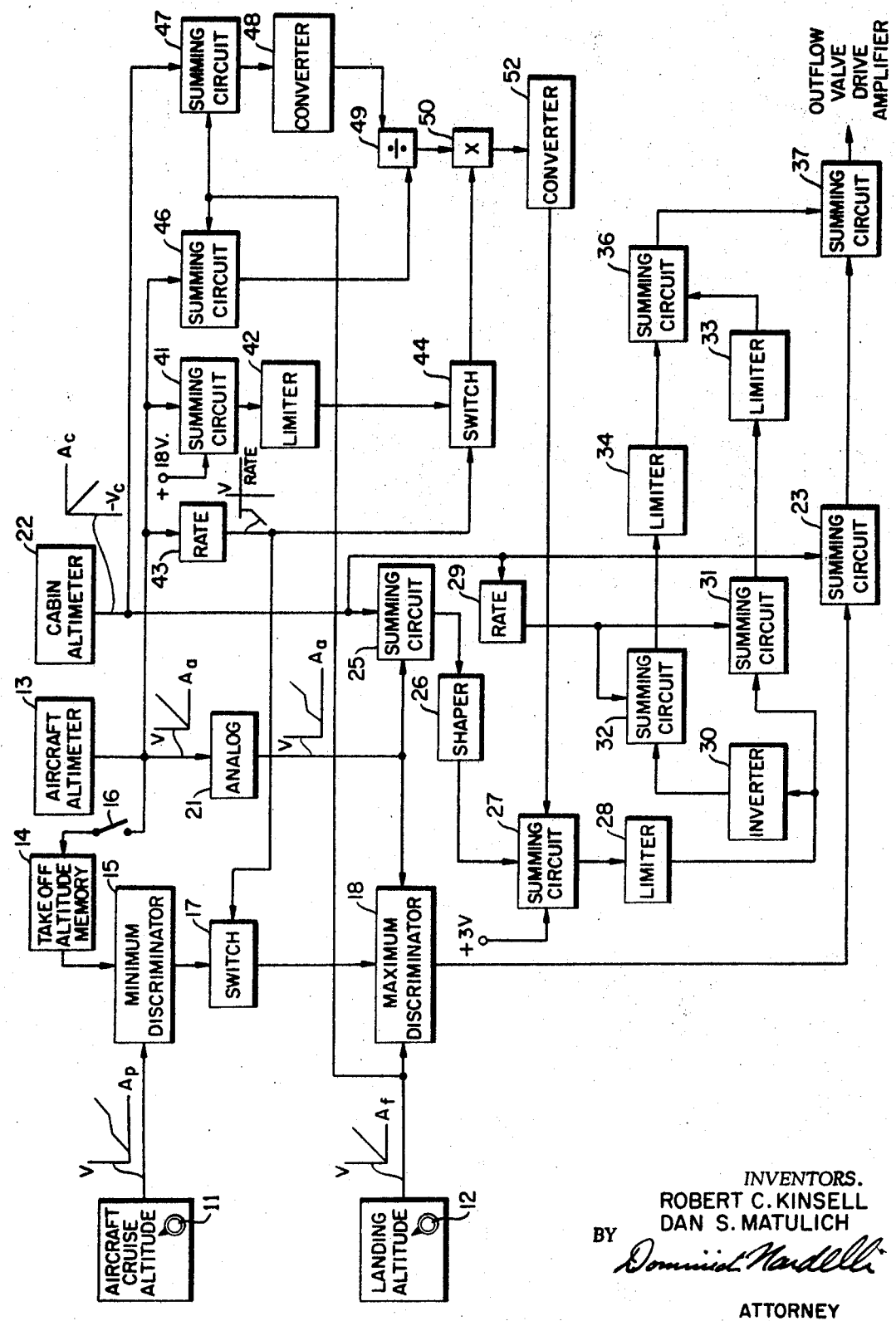

ABSTRACT OF THE DISCLOSURE

An automatic aircraft cabin pressure system wherein the altitude as measured is converted to the required cabin altitude, and this altitude is continuously compared to the actual cabin altitude to produce an error signal which is used to drive the outflow valve in the direction to reduce the error signal.

---

This invention relates to pressurized aircraft cabins and, more particularly, to a system for controlling and regulating the pressure therein.

When aircrafts are flying at high altitudes of, for example, over 10,000 feet, the passenger cabins are pressurized to provide a livable environment. Since passengers could live fairly comfortably at altitudes up to 10,000 feet, the aircraft cabin is structurally designed to withstand the maximum pressure differential which is governed by the aircraft's peak altitude and the altitude inside the cabin. To provide maximum comfort for the passengers, during aircraft climb, the cabin pressure should be reduced at a rate that is much slower than the aircraft climb rate. Conversely, during aircraft descent, the cabin pressure should be gradually increased so that the cabin pressure reaches the ambient pressure at the airfield at the same time the aircraft lands. Up to now, the pilot sets the rate of climb for the cabin (rate of depressurization) in the pressurization system. The cabin climb rate would be determined by the pilot to correspond to how fast he anticipated he was going to make the aircraft climb. Also, the cabin cruise altitude would be determined by the pilot to correspond to the aircraft cruise altitude. Thus, every time the pilot changed the aircraft's rate of climb, or aircraft's cruise altitude, a new setting for the cabin rate of climb and cabin cruise altitude had to be made in the system. When the pilot was ready to descend, the cabin pressure control system would have to be switched by the pilot to the landing mode in order that the cabin pressure reached the ambient pressure of the airfield at the same time the aircraft landed. Therefore, many times at crowded airfields and under adverse conditions, the pilot would not have sufficient time to change the settings in the pressurization systems. For example, the aircraft would be ordered to land by the control tower when the aircraft may be flying at 30,000 to 40,000 feet and the cabin pressure would be at 8,000 feet of elevation. Then, at a maximum cabin descent rate of 300 feet per minute, the pilot would require about 24 minutes before he could land the aircraft.

Therefore, an object of this invention is to provide a cabin pressure control system which in response to the aircraft's altitude automatically sets the cabin pressure accordingly.

Another object of this invention is to provide a cabin pressure control system wherein the pilot sets no more than two settings, before take-off and the system safely controls the cabin pressure or cabin rate of climb or descent without any further settings by the pilot.

Briefly, the invention includes a selector portion that provides for manual inputs such as the anticipated aircraft cruise altitude and the landing altitude. The take-off altitude is automatically stored in a memory. The signals representing the manual inputs and the automatic input are compared with each other and to a signal corresponding to the computed or scheduled cabin altitude for the instantaneous aircraft altitude. The comparison produces a cabin altitude command signal, indicating the altitude the cabin is to be taken. More specifically, the anticipated aircraft cruise altitude is converted to an anticipated maximum cabin altitude signal by suitable means. Then the anticipated cabin altitude signal and takeoff altitude signal are fed to a minimum signal discriminator. The lower of the two signals is passed through a switch, that is normally closed during takeoff, to a maximum signal discriminator along with the anticipated landing altitude and the scheduled cabin altitude signals. The highest value signal is used as the cabin altitude command signal. The cabin altitude command signal is compared to a signal representing the actual cabin altitude. If the two are not equal the direction and degree of difference are sensed to produce a drive signal to drive the outflow valve in the direction to cause the two signals to become equal. However, the degree of the non-equality of the signals is limited by a computed rate signal so that the cabin altitude does not change too fast. When the aircraft is descending faster than allowed for the cabin to pressurize at 300 feet per minute, means are included to lower the cabin altitude in proportion to the aircraft's rate of descent so that the cabin altitude and the aircraft reach the altitude of the airfield together. The system determines this condition and opens the switch between the minimum and maximum discriminators so that the takeoff altitude and the aircraft cruise altitude no longer tend to command the system. In addition, means are provided for determining the difference between the actual cabin altitude and the landing altitude and for determining the difference between the aircraft altitude and landing altitude. Then a signal is produced representing a ratio of the first mentioned difference to the latter difference. The aircraft's rate of descent is multiplied by the ratio giving the required rate of descent of the cabin in order for the cabin and aircraft to reach the landing altitude at the same time. The calculated cabin rate of descent is used to modify the outflow valve drive signal.

The foregoing and other objects, advantages and characterizing features of this invention will become apparent from the ensuing detailed description of various illustrative embodiments thereof, reference being made to the accompanying drawing wherein a block diagram of the invention is shown.

Referring to the drawing, the pilot, before takeoff, sets the anticipated aircraft cruise altitude on a potentiometer 11 and the altitude of the landing field on another potentiometer 12. The potentiometer 11 outputs a signal whose voltage is a non-linear function of the anticipated aircraft cruise altitude, for example, as shown in the graph, the voltage $V$ is zero from sea level to an aircraft altitude $A_p$ of 18,000 feet, then changes linearly from 18,000 feet to 24,000 feet, changes again linearly but with a lesser slope from 24,000 feet to 30,000 feet, and finally changes linearly with a greater slope from 30,000 feet to 43,000 feet, the ceiling of the aircraft. The shape of the particular curve that the voltage follows is a function of the aircraft's climb rate, structure, power, etc., and need not be linear. If the ceiling is higher than 43,000 feet the curve would be computed to that altitude as is standard in the art. Thus, the voltage of the signal outputted by potentiometer 11 is directly related to what the altitude within the cabin should be when the aircraft is at the set cruise altitude. For example, if the selected cruise altitude is 43,000 feet the signal would have a value of 8 volts to represent a maximum altitude of 8,000 feet within the cabin. On the other hand, the landing altitude potentiometer 12 produces a signal whose voltage is linearly related to the airfield's altitude $A_f$, i.e., 1 volt equals 1,000 feet also as shown. The system includes an altimeter 13 that measures the altitude of the aircraft and feeds to a memory 14 the altitude signal through a switch 16 that is normally closed when the aircraft is grounded. The voltage of the signal from altimeter 13 is directly related to aircraft altitude $A_a$ like the signal from potentiometer 12.

Thus, when the aircraft is airborne, the switch 16 opens registering the altitude of the airfield in the memory. The outputs of the memory 14 and the potentiometer 11 are fed to a minimum discriminator 15 which allows the lower of the two signals to pass through (for reasons that will be explained hereinafter) to a normally closed switch 17 to a maximum discriminator 18. To the maximum discriminator 18 is also fed the signal from potentiometer 12 and a signal from an analog computer or function generator 21. The generator 21 schedules the value that the cabin pressure should be for the instant aircraft altitude. The curve of the voltage output of the function generator 21 is very similar to the curve of the voltage output of potentiometer 11.

The maximum discriminator 18 passes the highest value signal, for reasons that will become apparent hereinafter, to a summing network 23 where a signal produced by a cabin altimeter 22 is compared with the signal from the discriminator 18. To facilitate the comparison, the cabin altimeter 22 produces a negative voltage signal to represent the cabin altitude $A_c$, as shown. The negative voltage is added by the circuit 23 to the positive voltage representing the signal from the discriminator 18. Then if the output signal of the circuit 23 is positive an outflow valve (not shown) is commanded to open to decrease the cabin pressure representing a corresponding increase in cabin altitude. If the output signal of circuit 23 is negative the outflow valve is commanded to close to increase the cabin pressure.

However, a rapid change in cabin pressure is objectionable because it causes discomfort to the passengers. Thus, the signal from the summing circuit 23 is modified by another summing circuit 37 to which is coupled a rate signal to prevent the outflow valve from rapidly changing positions. The rate signal is obtained from an error signal as produced by summing circuit 25, to which is coupled the negative cabin altitude signal from altimeter 22 and the positive scheduled cabin altitude signal from function generator 21. The cabin altitude error signal passes through a shaper circuit 26 where any negative error signal is blocked, for reasons that will become apparent hereinafter. Thus, the positive error signal is added to a constant positive voltage, for example, three volts in another summing circuit 27. Thus, when the cabin altitude is higher than or the same as the scheduled cabin altitude the output voltage of circuit 26 is zero, and the positive 3 volts passes through circuit 27 to produce a computed rate signal so that the cabin altitude tends to rise at, for example, 300 feet per minute represented by the 3 volts for reasons that will become apparent hereinafter. However, if the cabin altitude is lower than the scheduled cabin altitude, the positive error signal produced is added to the three volts so that the cabin altitude would rise faster than 300 feet per minute in order to catch up with the scheduled cabin altitude. A limiter circuit 28 is provided so that its output is limited to, for example, 5 volts for all command rate signals having a value of over 5 volts. Thus, the rate of altitude change of the cabin is limited to 500 feet per minute. The limited signal from the limiter 28 is coupled directly to a summing circuit 31 and, through an inverter 30, to another summing circuit 32. As will be explained, the command signal coupled to the summing circuit 31 controls the cabin rate of climb and the signal coupled to the summing circuit 32 controls the cabin rate of descent. To both summing circuits 31 and 32 is coupled the actual altitude rate of change signal of the cabin as computed by a rate circuit 29. The input to the rate circuit 29 is the signal from the cabin altimeter 22 and since this signal is negative the output of the rate circuit is either negative or positive depending whether the cabin altitude is rising or descending, respectively. If the cabin altitude is rising the negative cabin rate signal is added to the command rate signal in both summing circuits 31 and 32. If the the cabin altitude is rising slower than the command rate, signal the output of the circuit 31 is negative. The output of circuit 32 is also negative since both inputs are negative. Thus, negative signals from circuits 31 and 32 are coupled to limiter circuits 33 and 34, respectively. Limiter circuit 33 only passes negative signals and circuit 34 only passes positive signals. Thus, circuit 33 passes the negative signal to a summing circuit 36. However, if the cabin altitude is rising slower than the command rate, the output of circuit 31 would be positive and the output of circuit 29 would be less negative. Then both limiter circuits 33 and 34 block the signals. However, whenever the cabin altitude is rising too rapidly, the output of both circuits 31 and 36 are negative. This negative signal is added to the positive signal from circuit 23 by a summing circuit 37. The positive signal from circuit 23 is thus lowered causing the outflow valve to close slightly.

When the aircraft is cruising, the signal passing through the minimum discriminator normally would be the altitude of the last airfield if the altitude of the airfield is relatively low and the cruise altitude relatively high. Then the maximum discriminator 18 would normally pass the signal from function generator 21 assuming that the landing airfield is relatively low. If the aircraft descends momentarily the signal from summing circuit 23 and the error signal from summing circuit 25 would both be negative. However, the shaper circuit 26 prevents the negative value from being coupled to circuit 27, so that its output remains at 3 volts. Now, since the output of circuit 23 is also negative the outflow valve tends to close causing the cabin altitude to descend. This is sensed by the rate circuit 29 to produce a positive signal. Since both signals coupled to circuit 31 are positive, its output is positive and the output of limiter 33 is a zero. However, if the cabin rate of descent is over 300 feet per minute the output of circuit 32 is positive since the signal from circuit 29 is over a positive 3 volts and the signal from inverter 30 is 3 volts negative. Thus, the limiter 34 couples this positive signal to circuit 36 which, in turn, couples it to circuit 37 to counteract the negative signal from circuit 23 causing the outflow valve to open slightly to maintain the 300 feet per minute descending rate within the cabin. Naturally, if the cabin is not descending over 300 feet per minute the output of circuit 32 is negative and the output of limiter 34 is zero, and the signal from circuit 23 is not modified. Therefore, during descent the cabin altitude normally falls at the rate of no more than 300 feet per minute to provide maximum comfort and safety for the passengers. Whenever the aircraft descends faster than 300 feet per minute, a signal is generated by a rate circuit 43 that opens switch 17 disconnecting both the take-off altitude and anticipated cruise altitude from the system.

The aircraft now approaches the landing field and the pilot decides to descend in order to land. The system automatically switches to the landing mode so that the pilot can descend rapidly. During landing, the cabin altitude should reach the landing altitude when the aircraft touches ground. In this manner, the doors may be opened quickly and safely with the least amount of passenger discomfort. Therefore, if the pilot descends the aircraft at a relatively rapid rate, the portion of the system just described would not always drop the cabin altitude fast enough so that the cabin altitude is at airfield altitude at touch down. Thus, when the aircraft is below, for example, an altitude of 18,000 feet and descending faster than 300 feet per minute, the system automatically decides to bring the cabin altitude to landing altitude at the time that the aircraft lands. In most cases there is ample time for cabin to pressurize at a nominal rate of 300 feet per minute, however, in some rare cases this feature gives to the pilot greater latitude in landing the airplane descent profile. To determine when the pilot is going to land, the system includes a summing circuit 41 to which are coupled the aircraft altitude from the altimeter 13 and plus 18 volts which represents, for example, an altitude of 18,000 feet. Thus, when the aircraft is below 18,000 feet the output of circuit 41 is positive, but when the aircraft is above 18,000 feet the output is negative. The output of circuit 41 is coupled to a limiter circuit 42 that only allows the positive signal to pass therethrough to close a switch 44. When switch 44 is closed, the output of the rate circuit 43 is coupled to a multiplication circuit 50. The rate circuit 43 measures the rate of descent of the aircraft since the output of the altimeter 13 is coupled thereto. The rate circuit 43 produces a signal on its output whenever the rate of descent is over 300 feet per minute which signal has a negative voltage proportional to the rate only when the rate is over 300 feet per minute. This value for the rate of descent of 300 feet per minute is chosen because the features described thus far would cause the aircraft and the cabin to reach the landing altitude at the same time. The rate that the cabin altitude should be at so that the cabin and aircraft reach the same landing elevation together is calculated first by determining the cabin-landing difference, i.e., the difference between the cabin altitude and the landing altitude in a summing circuit 47 and by determining the aircraft-landing difference, i.e., the difference between the aircraft and the landing altitude in a summing circuit 46. The output of circuit 47 is coupled to a converter circuit 48 that reverses the polarity of the signal only when the signal is negative so that the output is always positive to indicate the absolute numeral difference in feet for reasons that will be hereinafter explained. The cabin-landing difference is divided by the aircraft-landing difference by a division circuit 49. Thus, an instantaneous ratio of the differences is continuously calculated. To this ratio is multiplied the aircraft rate of descent by the multiplication circuit 50 to calculate the required rate of altitude change for the cabin so that the cabin and aircraft reach the landing altitude together. However, the cabin rate of descent is never more than 500 feet per minute. Even if the aircraft is descending and the cabin altitude is below the landing altitude, the system still causes the aircraft and cabin to reach the landing altitude together. The converter 48 provides this feature since only the absolute value of the cabin-landing difference is coupled to circuit 49. Thus, the output signal of the division circuit 49 is always positive when the negative rate signal is multiplied to it by the multiplication circuit 50. Thus, the output signal of circuit 50 would be negative and this signal is coupled to a converter circuit 52 that inverts the signal to a positive signal and also subtracts three volts therefrom so that the output is zero for all calculated rate of change values below 300 feet per minute. Thus, if the cabin has to change altitude faster than 300 feet per minute, the positive signal from converter 52 is added to the plus three volts by circuit 27 to produce a positive rate signal representing the required cabin rate of change. Now, circuits 28, 30, 31, 32, 33, 34 and 36 produce the required signal to be coupled to circuit 37 so that the outflow valve would be opened or closed as needed.

The system also functions to control the cabin altitude to required value even though the cabin altitude for the selected cruise altitude is below the take-off altitude. For example, if the aircraft is taking off from an airfield having an elevation of 5,000 feet and the aircraft is to cruise at 20,000 feet at this cruise altitude, the cabin altitude should be about 2,000 feet. The minimum discriminator 15 passes the signal representing 2,000 feet so that the cabin altitude is placed at that level as soon as possible. This allows the aircraft to maneuver without restrictions since the system would cause the cabin altitude to respond accordingly.

Various other modifications and variations of the present invention are contemplated and will become apparent to those skilled in the art without departing from the spirit and scope of the invention.

What is claimed is:

1. In a pressure regulator system for an aircraft cabin, which system maintains the pressure within the cabin to a corresponding altitude somewhere between sea level and the maximum altitude where passengers, can live comfortably,
  an aircraft altimeter for continuously measuring the altitude of the aircraft and producing a first signal,
  a cabin altimeter for continuously measuring the relative altitude of the cabin and producing a second signal representing the cabin altitude,
  a converter responsive to first said signal from the aircraft altimeter for computing the desired cabin altitude for the particular aircraft altitude and producing a third signal representing said desired cabin altitude, and
  second means responsive to the third and first signals of said converter and of said cabin altimeters, respectively, to produce a fourth signal to cause the cabin altitude to become equal to the computed desired cabin altitude.

2. In the system of claim 1 wherein:
  a rate limiting means is provided to limit the rate of change of the cabin altitude by limiting the value of the fourth signal produced by said first means.

3. In the system of claim 2 wherein said rate limiting means includes:
  a fixed rate of change signal representing a fixed rate of altitude change for the cabin altitude,
  a rate measuring means for measuring the rate of change of the cabin altitude and producing a measured rate of change signal representing the rate of change,
  second means for comparing the measured rate of change signal to the fixed rate of change signal and producing a fifth signal proportional to the difference,
  means for adding said fifth signal from said second means to the fourth signal from said first means so that rate of change of the cabin altitude is limited.

4. In the system of claim 3 wherein is included:
  a third means for producing a sixth signal proportional to the difference between the desired cabin altitude and the measured cabin altitude, and
  a fourth means for adding the sixth signal from said third means to said fixed rate of change signal to produce a resultant signal representing an increase for the rate of altitude change.

5. In the system of claim 1 wherein:
  means are provided to record the anticipated aircraft cruise altitude and producing a cruise cabin altitude signal representing the desired cabin altitude for the anticipated cruise altitude,
  means are provided to record the altitude of the next landing field and producing a landing field altitude signal representing the altitude of the next landing field,
  said first means includes a discriminator means to which are coupled the third signal from said converter, the cruise cabin altitude signal, the landing field signal, and which discriminator means selects the signal representing the highest altitude that the cabin is to be taken and compares this signal with the second signal representing the measured cabin altitude to produce said signal that causes the cabin altitude to become equal to the desired cabin altitude.

6. In the system of claim 5 wherein:
a rate limiting means is provided to limit the rate of change of the cabin altitude by limiting the value of the fourth signal produced by said first means,
a fixed rate of change signal representing a fixed rate of altitude change for the cabin altitude,
a rate measuring means for measuring the rate of change of the cabin altitude and producing a measured rate of change signal representing the rate of change,
a second means for comparing the measured rate of change signal to the fixed rate of change signal and producing a fifth signal proportional to the difference,
means for adding said fifth signal from said second means to the fourth signal from said first means so that rate of change of the cabin altitude is limited.

7. In the system of claim 6 wherein:
a third means for producing a sixth signal proportional to the difference between the desired cabin altitude and the measured cabin altitude, and
a fourth means for adding the sixth signal from said third means to said fixed rate of change signal to produce a resultant signal representing an increase for the rate of altitude change.

8. In the system of claim 1 wherein:
means are provided to record the altitude of the take-off airfield and producing a take-off altitude signal representing the take-off altitude,
means are provided to record the altitude of the next landing field and producing a landing field altitude signal representing the landing altitude of the next landing field,
said first means includes a discriminator means to which are coupled the third signal from said converter, the take-off altitude signal, the landing field altitude signal, for selecting the signal representing the highest altitude that the cabin is to be taken, and for comparing this signal with the second signal representing the measured cabin altitude to produce said signal that causes the cabin altitude to become equal to the desired cabin altitude.

9. In the system of claim 1 wherein:
means are provided to record the anticipated aircraft cruise altitude and producing a cruise cabin altitude signal representing the desired cabin altitude for the anticipated cruise altitude,
means are provided to record the altitude of the take-off airfield and producing a take-off altitude signal representing the take-off altitude,
minimum discriminator means to which are coupled said cruise cabin altitude signal and said take-off altitude signal for selecting the signal representing the lower altitude,
means are provided to record the altitude of the next landing field and producing a landing field altitude signal representing the landing altitude,
said first means includes a maximum discriminator means to which are coupled the signal from said minimum discriminator, the third signal and the landing field altitude signal for selecting the signal representing the highest altitude that the cabin is to be taken and for comparing this maximum signal with the signal representing the measured cabin altitude to produce said signal to cause the cabin altitude to become equal to the desired cabin altitude.

10. In the system of claim 9 wherein:
a cabin altitude rate of descent control means is provided that is responsive to the landing field altitude signal, the first signal and the second signal to cause the aircraft and cabin to reach the landing altitude together, said cabin altitude rate of descent control means includes:
a rate circuit for measuring the rate of descent of the aircraft and producing an aircraft rate signal,
a first summing circuit for determining the difference between the cabin altitude and the landing field altitude,
a second summing circuit for determining the difference between the aircraft altitude and the landing field altitude,
a division circuit for producing a ratio signal of the difference between the cabin and landing field altitudes and the aircraft and landing field altitudes,
a multiplication circuit for multiplying the ratio signal to the aircraft rate signal to produce a cabin rate signal representing the required rate of change of the cabin so that the cabin altitude reaches the landing field altitude substantially at the time the aircraft lands, and
said first means is also responsive to the cabin rate signal.

11. In the system of claim 10 wherein:
means are provided for determining when the aircraft is below a given altitude and is descending faster than a given rate and producing a signal representing the condition,
means are provided responsive to the signal representing the condition to couple the aircraft rate signal to said multiplication circuit.

12. In the system of claim 11 wherein:
said means responsive to the signal representing the condition also decouple the minimum discriminator from said maximum discriminator.

13. In the system of claim 9 wherein:
a rate limiting means is provided to limit the rate of change of the cabin altitude by limiting the value of the fourth signal produced by said first means.

14. In the system of claim 13 wherein:
a fixed rate of change signal representing a fixed rate of altitude change for the cabin altitude,
a rate measuring means for measuring the rate of change of the cabin altitude and producing a measured rate of change signal representing the rate of change,
second means for comparing the measured rate of change signal to the fixed rate of change signal and producing a fifth signal proportional to the difference,
means for adding said fifth signal from said second means to the fourth signal from said first means so that rate of change of the cabin altitude is limited.

15. In the system of claim 14 wherein:
a third means for producing a sixth signal proportional to the difference between the desired cabin altitude and the measured cabin altitude, and
a fourth means for adding the sixth signal from said third means to said fixed rate of change signal to produce a resultant signal representing an increase for the rate of altitude change.

16. In the system of claim 1 wherein:
means are provided to record the altitude of the next landing field and producing a landing field altitude signal representing the landing altitude,
a cabin altitude rate of descent control means is provided that is responsive to the landing field altitude signal, the first signal and the second signal to cause the aircraft and cabin to reach the landing altitude together.

17. In the system of claim 16 wherein:
said cabin altitude rate of descent control means includes:
a rate circuit for measuring the rate of descent of the aircraft and producing an aircraft rate signal, a first summing circuit for determining the difference between the cabin altitude and the landing field altitude, a second summing circuit for determining the difference between the aircraft altitude and the landing field altitude, a division circuit for producing a ratio signal of the difference between the cabin and landing field altitudes and the aircraft and landing field altitudes, a multiplication circuit for multipling the ratio signal to the aircraft rate signal to produce a cabin rate signal representing the required rate of change of the cabin so that the cabin altitude reaches the landing field altitude substantially at the time the aircraft lands, and said first means is also responsive to the cabin rate signal.

18. In the system of claim 17 wherein:

means are provided for determining when the aircraft is below a given altitude and is descending faster than a given rate and producing a signal representing the condition, means are provided responsive to the signal representing the condition to couple the aircraft rate signal to said multiplication circuit.

19. In the system of claim 16 wherein:

a rate limiting means is provided to limit the rate of change of the cabin altitude by limiting the value of the fourth signal produced by said first means.

20. In the system of claim 19 wherein:

a fixed rate of change signal representing a fixed rate of altitude change for the cabin altitude, a rate measuring means for measuring the rate of change of the cabin altitude and producing a measured rate of change signal representing the rate of change, second means for comparing the measured rate of change signal to the fixed rate of change signal and producing a fifth signal proportional to the difference, means for adding said fifth signal from said second means to the fourth signal from said first means so that rate of change of the cabin altitude is limited.

21. In the system of claim 20 wherein:

a third means for producing a sixth signal proportional to the difference between the desired cabin altitude and the measured cabin altitude, and a fourth means for adding the sixth signal from said third means to said fixed rate of change signal to produce a resultant signal representing an increase for the rate of altitude change.

References Cited

UNITED STATES PATENTS

| | | | |
|---|---|---|---|
| 3,364,837 | 1/1968 | Schooling | 98—1.5 |
| 3,373,675 | 3/1968 | Best | 98—1.5 |
| 3,376,803 | 4/1968 | Emmons | 98—1.5 |

MEYER PERLIN, Primary Examiner

UNITED STATES PATENT OFFICE
CERTIFICATE OF CORRECTION

Patent No. 3,461,790     Dated August 19, 1969

Inventor(s) Robert C. Kinsell and Dan S. Matulich

It is certified that error appears in the above-identified patent and that said Letters Patent are hereby corrected as shown below:

Column 4, line 12, delete "slower" and substitute therefor -- faster --.

SIGNED AND SEALED
AUG 11 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,461,790   Dated August 19, 1969

Inventor(s) Robert C. Kinsell and Dan S. Matulich

It is certified that error appears in the above-identified patent and that said Letters Patent are hereby corrected as shown below:

Claim 1, Column 6, line 29, delete "second" and substitute therefor --first--; and delete "first" and substitute therefor --second--.

SIGNED AND SEALED
OCT 27 1970

(SEAL)
Attest:

Edward M. Fletcher, Jr.
Attesting Officer

WILLIAM E. SCHUYLER, JR.
Commissioner of Patents